No. 686,072. Patented Nov. 5, 1901.
J. HOGG.
CARD FEEDING AND WEIGHING MECHANISM.
(Application filed Feb. 18, 1901.)
(No Model.) 6 Sheets—Sheet 1.
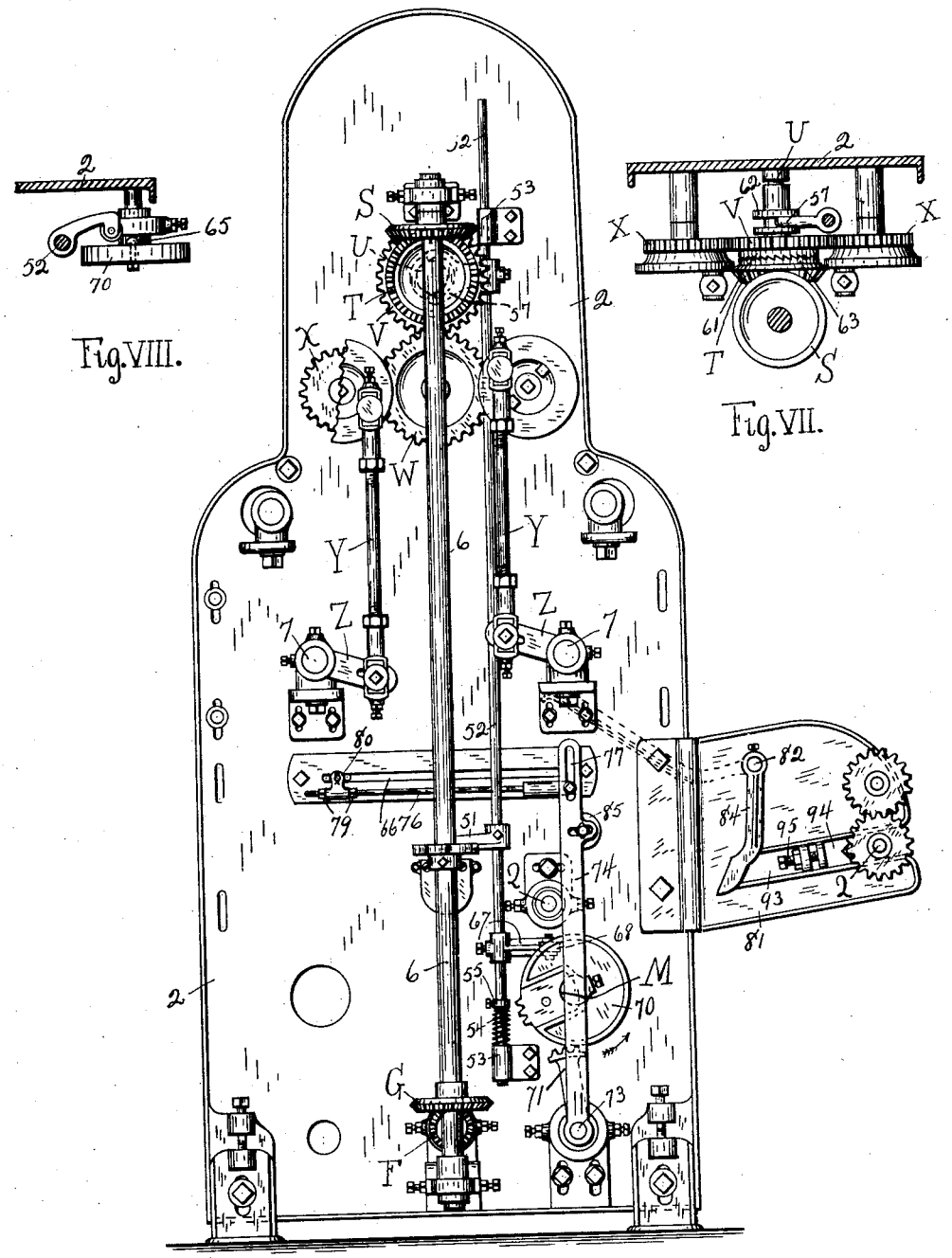
Fig. VIII.
Fig. VII.
Fig. I.
WITNESSES:
C. C. Schorneck
E. L. Darling.
INVENTOR
James Hogg
BY Alfred Wilkinson
ATTORNEY.
THE NORRIS PETERS CO., PHOTO-LITHO., WASHINGTON, D. C.

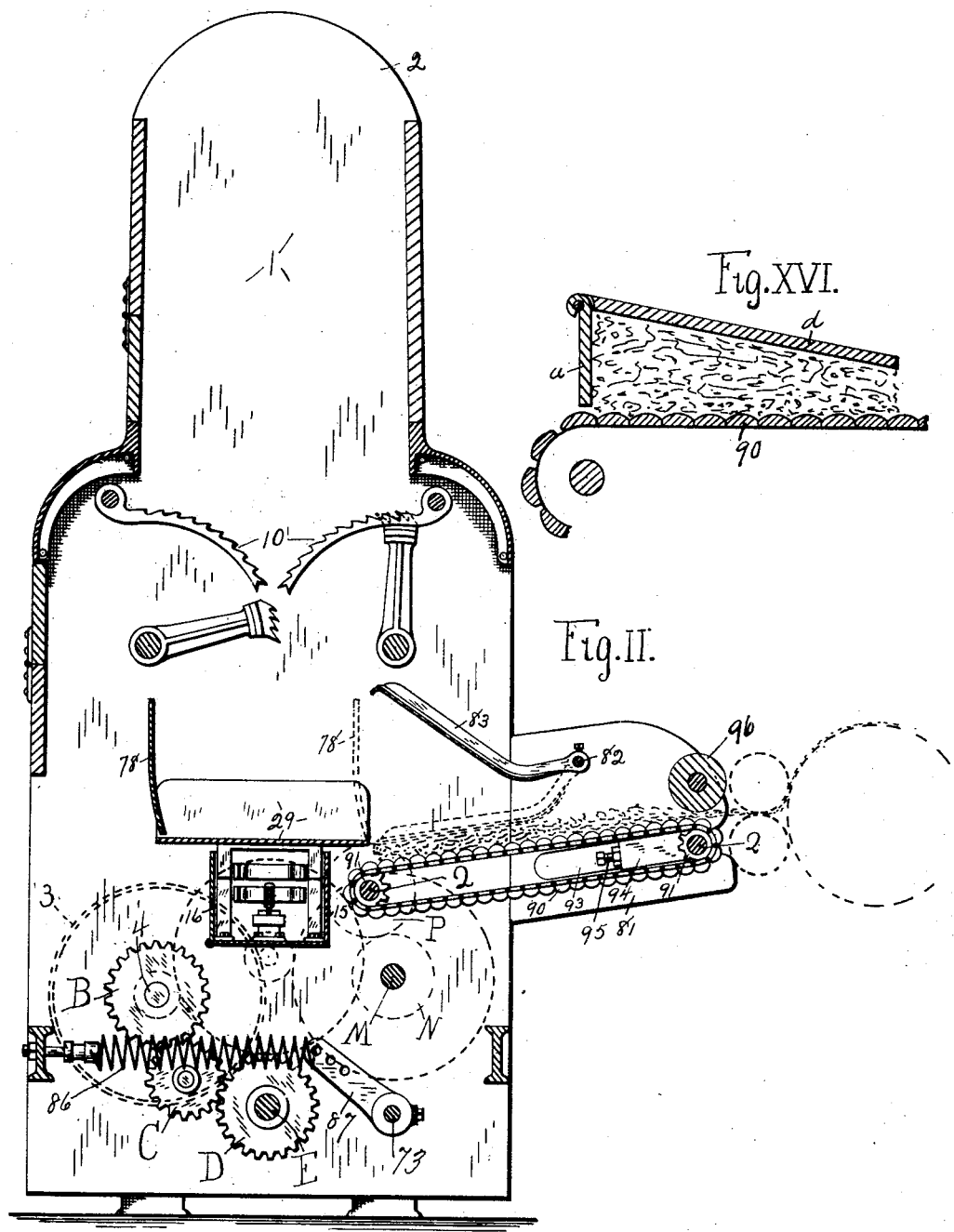

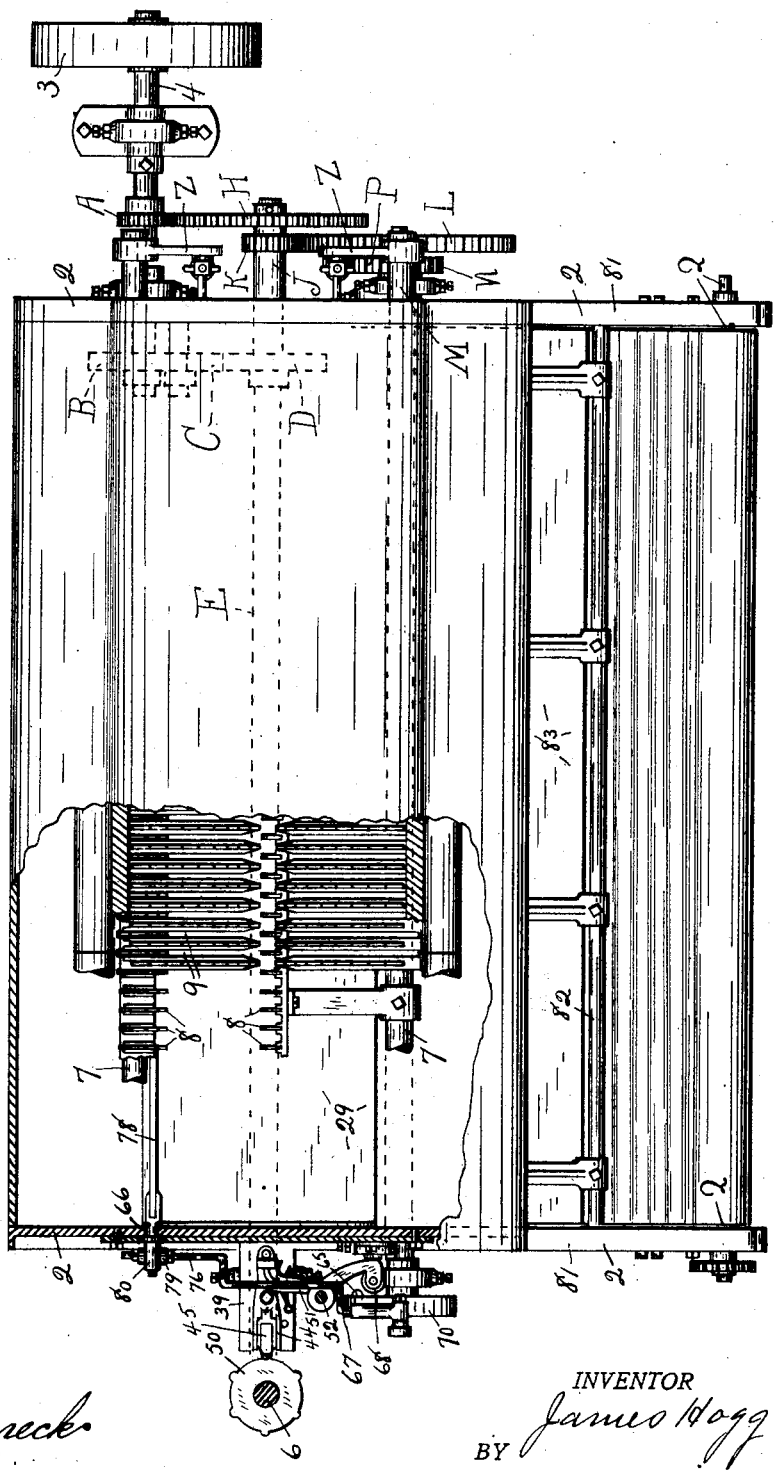

No. 686,072. Patented Nov. 5, 1901.
J. HOGG.
CARD FEEDING AND WEIGHING MECHANISM.
(Application filed Feb. 18, 1901.)
(No Model.) 6 Sheets—Sheet 4.
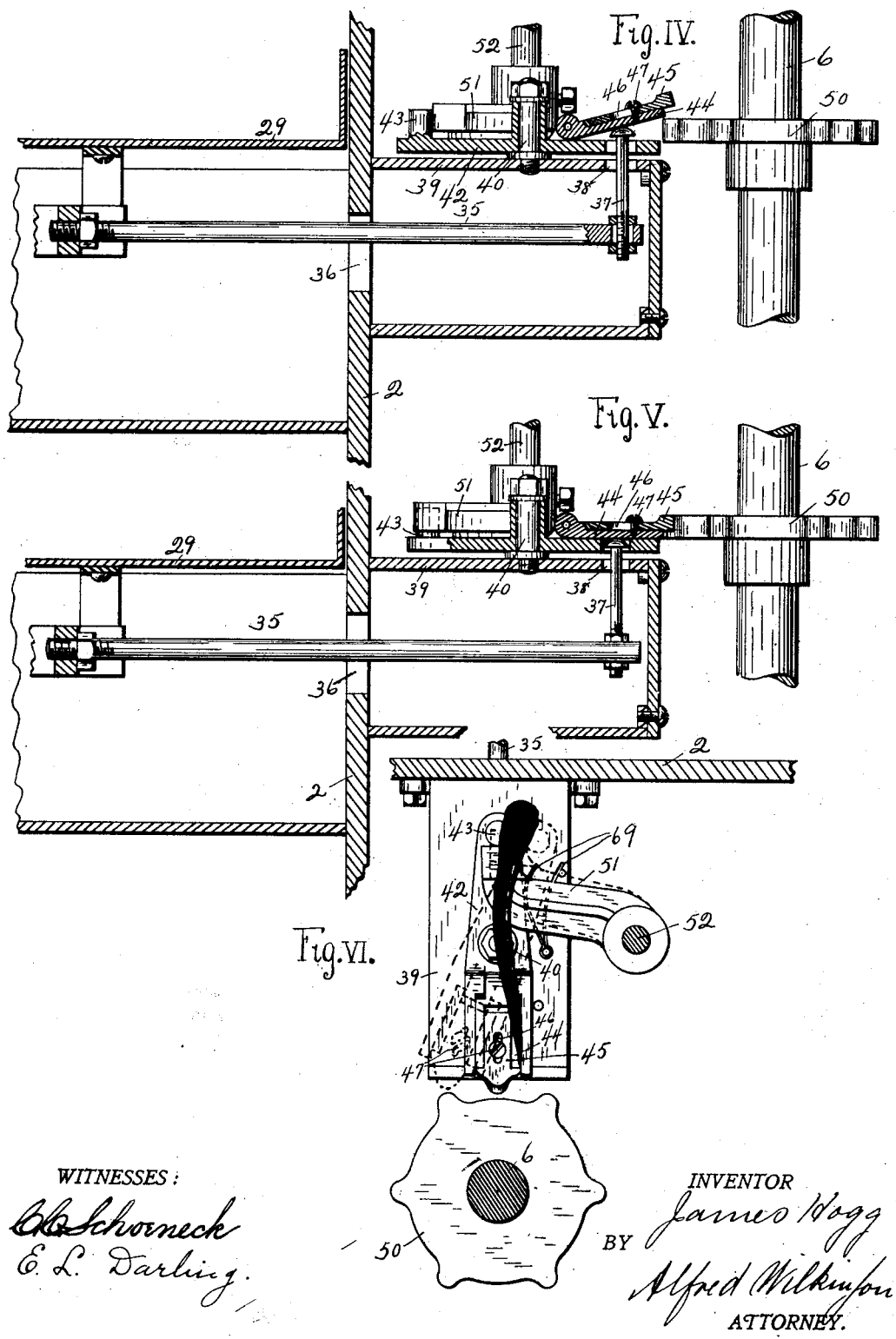
WITNESSES:
CH Schorneck
E. L. Darling.
INVENTOR
James Hogg
BY
Alfred Wilkinson
ATTORNEY.
THE NORRIS PETERS CO., PHOTO-LITHO., WASHINGTON, D. C.

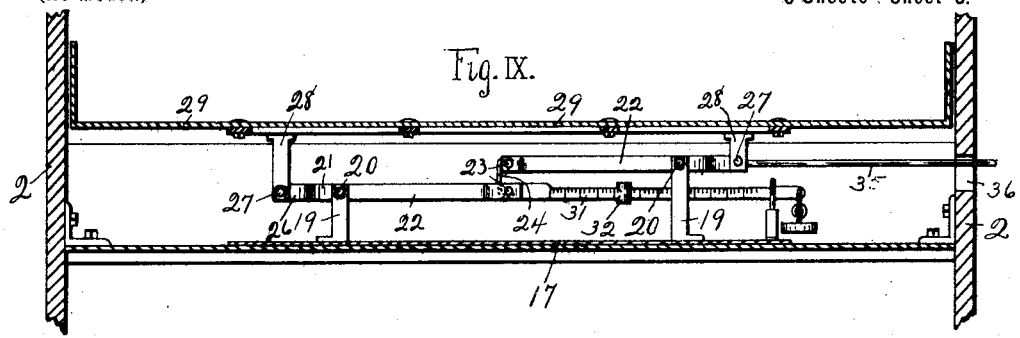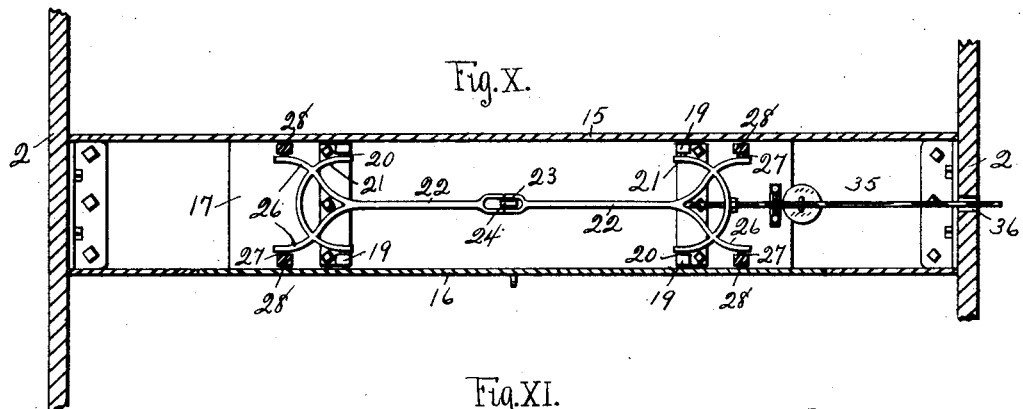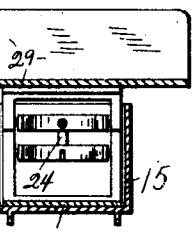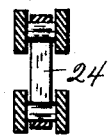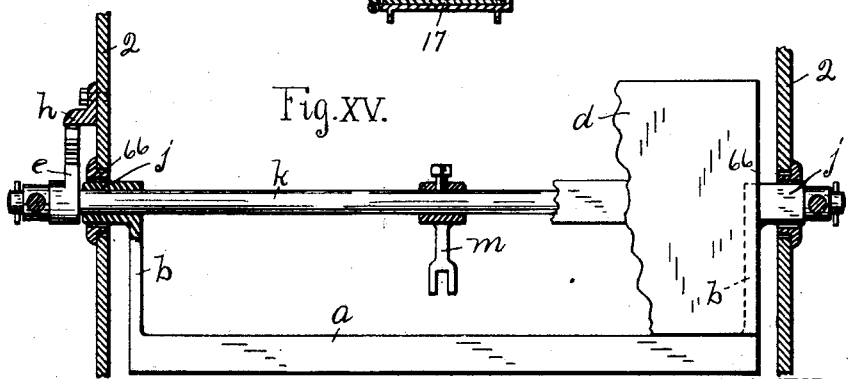

No. 686,072. Patented Nov. 5, 1901.
J. HOGG.
CARD FEEDING AND WEIGHING MECHANISM.
(Application filed Feb. 18, 1901.)
(No Model.) 6 Sheets—Sheet 6.
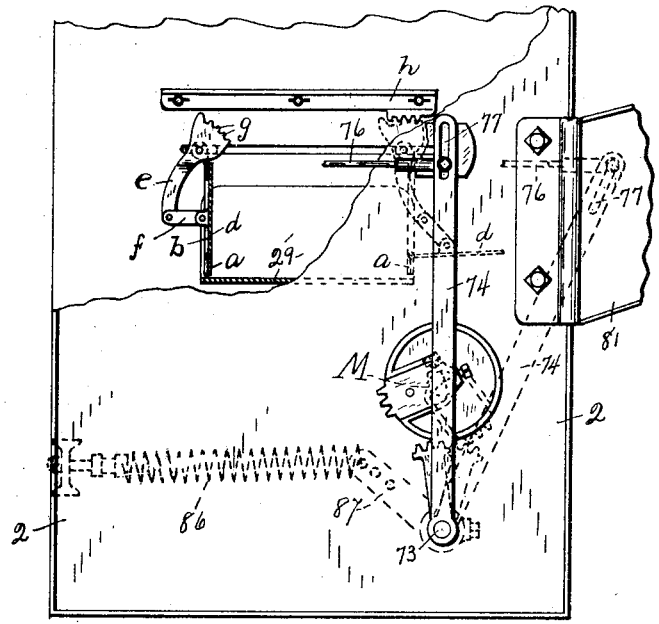
Fig. XIII.
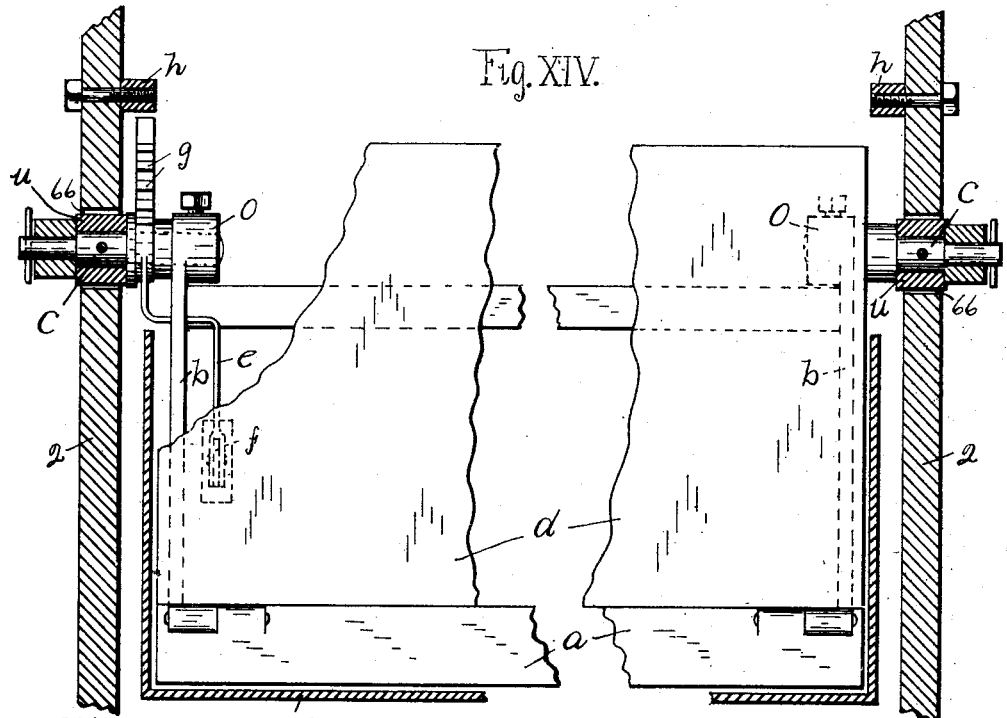
Fig. XIV.
WITNESSES: CB Schorneck, E. L. Darling
INVENTOR James Hogg
BY Alfred Wilkinson
ATTORNEY.

UNITED STATES PATENT OFFICE.

JAMES HOGG, OF AMSTERDAM, NEW YORK, ASSIGNOR TO AMERICAN CARD FEEDER COMPANY, OF AMSTERDAM, NEW YORK.

CARD FEEDING AND WEIGHING MECHANISM.

SPECIFICATION forming part of Letters Patent No. 686,072, dated November 5, 1901.

Application filed February 18, 1901. Serial No. 47,755. (No model.)

*To all whom it may concern:*

Be it known that I, JAMES HOGG, of Amsterdam, in the county of Montgomery, in the State of New York, have invented new and useful Improvements in Card Feeding and Weighing Mechanism, of which the following, taken in connection with the accompanying drawings, is a full, clear, and exact description.

My invention relates to the feed mechanism for carding-machines; and it consists of a platform-scale of new construction and a removing mechanism operated in coöperation therewith and with the feed mechanism, whereby the separated fiber is automatically weighed and periodically delivered to the card, with the result that the fiber is delivered continuously and uniformly as to time, speed, and space and in the best condition.

The essential features of my invention are the feed, of any suitable construction, a platform-scale, with all its levers, bearings, and graduated bar arranged beneath the platform, an inclosing case for the scale parts, a pusher operating at fixed intervals to sweep or deliver the stock from the platform to the feed-apron or other carrier, means operated by the platform-scale temporarily to stop the operation of the feed mechanism until the pusher has delivered the stock and returned to its first position, a presser arranged to press and condense the stock to render it more uniform and in better condition for the feed-rolls on the card, and operating-shafts, gears, and connections. The pusher and presser are preferably combined in one part, as hereinafter shown.

My invention will be understood by reference to the accompanying drawings, in which the same reference characters indicate the same parts in all of the figures.

Figure I is an end elevation showing the connections by which the clutch, pusher, and presser are directly operated. Fig. II is a vertical cross-section thereof. Fig. III is a top plan view of the preceding, with portions broken away and portions shown in section. Figs. IV and V are enlarged detail views in section of the tripper mechanism by which the movement of the vertical or clutch rock-shaft and the relation of the clutch members is controlled. In Fig. IV the platform is elevated, in Fig. V depressed by the load. Fig. VI is a top plan view of a portion of the preceding, the position of the parts when the clutch members are separated being indicated in dotted lines. Fig. VII is a top plan of the clutch and adjacent parts. Fig. VIII is a detail top plan of the mechanism by which the clutch is returned to engagement. Figs IX, X, and XI are respectively side elevation, top plan, and cross-section of the platform-scale. Fig. XII is a detail thereof enlarged, showing the connection between two scale-levers. Fig. XIII is a side elevation, with portions broken away, of a preferred form of pusher and presser combined in one part. Fig. XIV is a front elevation of the preceding enlarged, portions being shown in section. Fig. XV is an elevation corresponding to Fig. XIV and showing a simple and better form; Fig. XVI, another adjusted position of presser.

In the figures, 1 indicates the feed-chute, preferably widening at the bottom, of which 2 2 are the end plates or side frames, 3 the main pulley, 4 the pulley-shaft carrying pinion A and on its inner end gear B, meshing with intermediate pinion C on suitable stud, which engages with gear D on main shaft E, carrying bevel-gear F on its opposite end, meshing with bevel-gear G on main vertical shaft 6.

Pinion A meshes with large pinion H on stud J, carrying also small pinion K, meshing with gear L on mutilated-gear shaft M, through which the pusher is operated. On shaft M is also keyed pinion N, meshing with gear P on one of the apron-shafts Q.

On the upper end of vertical shaft 6 is keyed upper bevel-gear S, meshing with bevel-gear T on stud U. From this, through clutch mechanism to be described, gear V and intermediate gear W, gears X X, pitmen Y Y, and cranks Z Z, are rocked the rock-shafts 7 7, carrying combs 8 8 to comb down fiber through slots 9 9 in the chute-bottom 10 10, whence it falls in light open condition onto the scale-platform. This platform-scale is inclosed and protected from dirt, dust, and interference in a suitable inclosing box 15, having door 16, and is supported on a base-plate 17, carried between the end plates, on which are fulcrum-arms 19 19 of different heights for the bearings or fulcrums 20 20 of the inner forked ends 21 21 of scale-levers 22 22, having at their adjacent inner ends bearings 23 23 and there connected by a link 24 and having outer forked ends 26 26, with bearings 27 27 for the angle-irons 28 28 or other suitable supports of the platform 29, of any suitable construction. The bearings are all preferably knife-edged and the scale-levers made substantially as here shown, with the double forked ends for the respective bearings 20 and 27. To the inner end of one scale-lever is secured the graduated scale-arm 31, to which is fitted the sliding weight or counterpoise 32, which may be fixed at any point, determining the amount of stock which will be weighed automatically and depress the platform.

In Fig. IX are shown nuts and bolts, unlettered, by which the platform 29 is secured in position on a base, unlettered, supported on angle-irons 28.

To one scale-arm (or to the platform, if desired) is attached the tripper 35, extending outwardly through the opening 36 and carrying on its outer end the adjustable tripper-pin 37, extending upwardly through a hole 38 in the inclosing shell 39, carrying on its upper surface the stud 40, on which is journaled the swinging dog-arm 42, provided with a stop 43 at its inner end and at its outer end a hinged latch-piece 44, carrying thereon the dog 45, adjustable by means of slot 46 and set-screw 47. The tripper-pin 37 engages with the dog-latch to elevate or depress it with the platform and tripper. When the tripper 35 is depressed, the dog and latch drop with it and the dog engaging with the teeth of rotating rack 50 on shaft 6 the dog-arm and stop 43 are swung clear of an upper rock-arm 51 on the vertical or clutch rock-shaft 52, journaled in suitable bearings 53 53 on the end plate, and said shaft is turned or rocked by spring 54, whose ends are secured, respectively, to the lower bearing and to a collar 55, adjustable on the rock-shaft by a set-screw, whereby the forked arm 57, secured to the upper end of the rock-shaft, is swung in, carrying with it the gear V and clutch member 61, integral with grooved pulley 62, out of engagement with the outer clutch member 63, and the feed is temporarily stopped until the pusher has removed the fixed amount of fiber from the platform and is returned to normal position. When this has been effected, the clutch members are returned to engagement by engagement of anti-friction-roller 68 on a lower rocker-arm 67, also adjustably keyed on rock-shaft 52, with stud 65 on inner face of mutilated gear 70, constantly rotating on its shaft M, by which also the push-board is operated through the following mechanism: 69 is spring to return dog-arm 42 to first position. 70 is a mutilated gear having a limited number of teeth and rotating in the direction indicated by the arrow to engage at each rotation with a corresponding rock-arm or toothed crank 71, keyed on rock-shaft 73, on which is also keyed the pusher-arm 74, having slot 77 at its upper end for attachment of connecting-rod 76, adjustably connected to the pusher or pusher-board 78 by any suitable means, such as nut 79 79 and ear 80, outwardly extending through slot 66. Pusher is returned to first position by spring 86, connected to crank-arm 87, keyed on rock-shaft 73. On the end plates are secured the end-plate extensions 81 81, in which is journaled presser rock-shaft 82, carrying the presser 83. On said shaft is also keyed crank 84, by engagement with which of anti-friction-roller 85 on presser-arm 74 the presser is rocked down onto the fiber when it has been pushed onto the apron to compress and compact it slightly, rendering it more uniform in thickness. The presser or presser-board 83 is comparatively light, while 84 is a heavy metallic crank which by its weight returns to the position indicated in Fig. I and elevates the presser from the stock into the position shown in Fig. II when the arm 74, carrying the antifriction-roller 85, has returned to its normal position. (Shown in Fig. I.)

The slat-apron 90 or other suitable carrier is arranged on sprockets 91 91 on shafts Q, suitably journaled, the outer longitudinally adjustable in slots 93 93 to adjust the tension of the apron by blocks 94 94 and set-screws 95 95, the apron being driven by pinion N, meshing with pinion P on one of the shafts Q.

96 is a roller for holding and pressing the stock lightly, allowing it to pass in good condition to the card-rollers and card. (Here indicated in dotted lines.)

While the described construction of pusher and presser are successful, I prefer the construction shown in Figs. XIII, XIV, or XV, in which they are combined in the pusher-presser. Here the lower portion $a$ or pusher-board of the pusher-presser is maintained constantly in a vertical position by arms $b$ $b$, keyed on studs $c$ $c$, pinned in blocks $u$, flattened to fit slots 66, so that they cannot turn therein, but maintain the pusher-board constantly upright. Between block $u$ and collar $o$ of arm $b$ is the arm $e$, connected to presser-board $d$ by link $f$ and provided with teeth $g$ to engage with fixed rack $h$, whereby arm $e$ is rocked when pusher-presser is in forward position and presser-board is swung down onto stock, as indicated by dotted lines in Fig. XIII.

Fig. XV shows a simple and preferred form of the combined pusher-presser. Here sleeves $j$, flattened to fit the slots, correspond to studs $c$ and carry the arms $b$ and pusher-board $a$. Shaft $k$ is journaled in these sleeves and extends outwardly, carrying toothed arm $e$ on its outer end to engage with fixed rack $h$ and arm $m$ within, connected to the presser-board to swing it down when the shaft is rocked. It is evident that the presser-board may be arranged to come down parallel to the apron or at an angle thereto (indicated in Fig. XVI)

to compress the stock nearest the card-rolls more than that at a distance therefrom, tending to make it more uniform with the preceding stock.

The operation of my mechanism will be clear from this description. The scale being set to weigh a predetermined amount at each operation, the feed mechanism must be operated at a sufficient rate of speed to bring down that amount to depress the platform and stop the feeding mechanism through the tripper mechanism before the pusher-presser comes into operation, which is effected at fixed intervals. The feed after each quantity of stock has been weighed must be stopped a sufficient length of time for the pusher-presser to remove the stock to the carrier and return to its original position. The pusher-board then removes the stock from the platform to the apron, the presser-board condenses it, and the parts return to their original position.

Heretofore scales have been used with card-feeders, but exposed, subject to wear, and not positively fixing the amount of stock nor delivering it in uniform condition nor uniformly and continuously. The parts and connections have been complicated and liable to wear.

In my invention I have introduced new features, a new mode of operation, and a simple tripper and connecting mechanism by which all the parts coöperate to the result. The scale is well adapted to its work. The pusher and presser are positive and yet delicate in operation, delivering the stock as it comes from the feed with certainty, uniformity, and in practically the best condition. All the parts are strong, simple, durable, and combined to coöperate in a single compact machine.

What I claim, and desire to protect by Letters Patent, is—

1. In combination in a card-feeding machine, suitable feeding mechanism to separate the fiber, a scale provided with a platform to receive the separated fiber, a reciprocating pusher-board, means for periodically moving the pusher-board across the platform to remove the stock therefrom, means for operating the feeding mechanism, and means for temporarily suspending its operation while the pusher-board is removing the stock.

2. In combination in a card-feeding machine, the feeding mechanism and means for operating it, a receiving-platform, a carrier, means to deliver the stock from the receiving-platform to the carrier, a presser-board, means for operating the presser-board periodically after the stock has been delivered to the carrier, and means for temporarily suspending the operation of the feeding mechanism while the stock is being delivered and the presser-board is in operation.

3. In a card-feeding machine, the combination with the feeding mechanism of a scale provided with a platform arranged below the feeding mechanism to receive the stock therefrom, a pusher-board reciprocating across the platform to deliver the fixed quantities of stock therefrom to a suitable carrier, means for periodically moving the pusher-board across the platform and for returning it to its normal position, means for operating the feeding mechanism, and means operated by the depression of the scale by the fiber thereon temporarily to suspend the operation of the feeding mechanism.

4. In a card-feeding machine, the combination with suitable feeding mechanism for separating the stock, of a scale provided with a platform to receive the stock as it falls from the feeding mechanism, a pusher-board adapted to reciprocate across the platform, means for periodically moving the pusher-board across the platform to deliver the stock therefrom to a suitable carrier, a presser-board, means for periodically operating the presser-board to compress the stock after it has been delivered, means for operating the feeding mechanism, and means temporarily to suspend its operation while the pusher-board and presser-board are in operation and returning to their original position.

5. In combination in a card-feeding machine, the feeding mechanism and means for operating it, a platform-scale arranged beneath the feeding mechanism, a pusher-board to remove the stock from the platform, a presser-board to press the stock after it has been removed, means for operating the pusher-board and presser-board periodically, and means operated by the depression of the platform temporarily to suspend operation of the feeding mechanism.

6. In combination in a card-feeding machine, the feed mechanism, a platform-scale, a pusher-board to deliver fixed quantities of stock from the platform to a suitable carrier, a presser-board, means for operating the pusher-board and presser-board periodically, a main shaft, connections between said main shaft and the feed mechanism to operate said mechanism, a clutch composed of two members arranged in said connections, a tripper operated by depression of the platform, and connections between the tripper and one clutch member to separate the clutch members and temporarily suspend operation of the feeding mechanism.

7. A platform for a card-feeding mechanism having in combination a suitable base and inclosing box, suitably supported, two fulcrum-arms of different height arranged on the base, two scale-levers supported on bearings on said fulcrum-arms, arranged one higher than the other and having their adjacent inner ends arranged one above the other, a link connecting said inner ends, a platform-scale supported on the outer ends of said scale-levers, and a graduated scale-arm with a movable weight secured to one of said scale-levers.

8. A platform-scale for a card-feeding mechanism having in combination a suitable supporting-frame, a supporting-base, an inclosing box carried thereon, two pair of fulcrum-arms arranged on said base, one pair higher than the other, two scale-levers provided each on its outer end with inner and outer forks, the inner forks fitted to the respective pairs of fulcrum-arms and resting in bearings thereon, bearings on said outer forks, a platform carried on said outer forks, said scale-levers having inwardly-extending adjacent ends, arranged one above the other, a link connecting said inner ends, and a graduated scale-arm outwardly extending from one of said scale-levers.

9. In combination in a feeding-machine for card-feeders, the feeding mechanism, a main shaft and gear thereon, a vertical shaft, two gears thereon, one in mesh with the main-shaft gear, a clutch composed of two members supported on a suitable pin, the first member keyed thereon and provided with a gear meshing with one of the vertical-shaft gears, and the other member adapted to slide on the pin and provided with a gear to mesh with the feeding-mechanism gears, connections from the feeding-mechanism gears to operate the feeding mechanism, a platform-scale suitably supported, a tripper moving up and down therewith, connections between the tripper and the sliding clutch member to separate said clutch members and temporarily suspend operation of the feeding mechanism, and a combined pusher and presser to deliver the stock from the platform to a suitable carrier and to condense the stock, means to return the pusher to its first position, and connections from the main shaft to operate the pusher and presser periodically.

10. In combination in a card-feeding machine, a suitably-supported frame, the feeding mechanism, a platform-scale, connections operated by the scale temporarily to suspend operation of the feeding mechanism, end plates horizontally slotted, a mutilated gear and gear-shaft suitably journaled in the end plates, a horizontal rock-shaft also horizontally journaled therein, a pusher-arm keyed on said rock-shaft, a toothed crank-arm also keyed on said rock-shaft and adapted to engage with said mutilated gear, a lower pusher-board arranged adjacent to and across the platform of the scale, arms fitted to the slots carrying said pusher-board, an upper presser-board hinged to the pusher-board, a hinged fixed rack adjacent to the forward slot or slots, a toothed arm or arms hinged to the presser-board and adapted to engage with said fixed rack to swing the presser-board down on the stock when the pusher-presser has reached its forward position, a connection between the pusher-arm and the pusher-presser, means for operating the feeding mechanism and the mutilated-gear shaft, a carrier arranged to receive the stock from the platform and transfer it to the card and means for operating said carrier.

11. In combination in a card-feeding machine, a suitable supporting-frame and end plates, the feeding mechanism, a platform-scale arranged beneath the feeding mechanism, a lower pusher-board carried on suitable arms fitted to slots in the end plates, an upper presser-board hinged to the pusher-board, a rock-shaft also fitted to said slots, an arm keyed on the rock-shaft and connected to the presser, a toothed arm keyed to one end of the shaft, and a fixed rack to engage with said toothed arm when the pusher is in its forward position to rock the shaft and swing the presser-board down on the stock, and means periodically to move the pusher-presser forward to remove the stock from the platform.

12. In combination in a card-feeding machine, a suitably-supported frame, the feeding mechanism, a platform-scale, connections operated by the scale temporarily to suspend operation of the feeding mechanism, end plates horizontally slotted, a mutilated gear and gear-shaft suitably journaled in the end plates, a horizontal rock-shaft also journaled therein, a pusher-arm keyed on said rock-shaft, a toothed crank-arm also keyed on the rock-shaft to engage with said mutilated gear, a lower pusher-board arranged adjacent to and across the platform of the scale, arms fitted to the slots carrying said pusher-board, an upper presser-board hinged to the pusher-board, a fixed rack adjacent to the forward end of the slot, a toothed arm connected to the presser-board and adapted to engage with said fixed rack to swing the presser-board down on the stock when the pusher-presser has reached its forward position, a connection between the pusher-arm and the pusher, and means for operating the feeding mechanism and the mutilated-gear shaft.

13. In combination in a card-feeding machine, the feeding mechanism, a main shaft and means for communicating power thereto, a vertical shaft, two bevel-gears thereon, a gear on the main shaft meshing with one of said bevel-gears, a clutch composed of two members suitably journaled, one clutch member provided with a gear meshing with one of the vertical-shaft bevel-gears and continuously rotating therewith, and the other clutch member adapted to slide into and out of engagement and provided with a gear meshing with an intermediate gear for operating the feeding mechanism; a platform-scale supported in a suitable inclosing case, an outwardly-extending tripper on the scale moving up and down therewith, a pin on the tripper, a swinging dog-arm suitably journaled, a stop on the inner end of the dog-arm, a hinged latch-piece on the outer end of the dog-arm resting on the pin and rising and falling therewith, an adjustable dog extending outwardly from the latch-piece; a rotating rack on the vertical shaft to engage with the dog when the dog is depressed; a vertical rock-shaft, a rocking spring thereon, a rocker-arm on the rock-shaft to engage with said stop, a forked arm also on the rock-shaft to engage with the sliding clutch member, to separate said clutch members and temporarily suspend operation of the feeding mechanism, when the latch-pin is swung by the rotating rack, a combined pusher and presser periodically to remove the stock from the platform to a suitable carrier and to press it on the carrier; a suitable carrier-apron, and means for operating the carrier and periodically operating the pusher-presser.

14. In combination in a feeding-machine for card-feeders, the feeding mechanism, a main shaft and means for communicating power thereto, a vertical shaft, two gears thereon, operative connections between the main shaft and the feeding mechanism and one of the vertical-shaft gears respectively, a clutch composed of two members suitably journaled, a gear on one of the clutch members meshing with one of the vertical-shaft gears, the second clutch member turning with the first member when in engagement and adapted to be moved temporarily out of engagement, a gear on the second clutch member to mesh with gears on the feeding mechanism, connections from said feeding-mechanism gears to operate the feeding mechanism, a platform-scale, a tripper thereon and moving up and down therewith, a swinging dog-arm, a dog on its outer end rising and falling with the tripper, a rotating rack on a vertical shaft engaging with the dog when the dog is depressed, a vertical rock-shaft, a rocking spring connected thereto, a rocker-arm on the rock-shaft engaging with the dog-arm stop, a forked arm on the rock-shaft engaging with the second clutch member, a second rock-arm on the rock-shaft, a mutilated gear suitably journaled and having a pin on its inner face to engage with the second rock-arm to turn rock-shaft and clutch to first or engaging position, connections from the main shaft to rotate the mutilated gear, a pusher, operative connections from the mutilated gear to the pusher periodically to reciprocate the latter, a presser and means to operate the presser to press down the stock when it has been pushed forward, and a carrier to deliver the stock to the card.

15. In combination in a feeding-machine for card-feeders, the feeding mechanism, a pulley, a pulley-shaft, a pinion on the pulley-shaft, a main shaft, intermeshing gears on the pulley-shaft and the main shaft, a vertical shaft, upper and lower bevel-gears thereon, a bevel-gear on the main shaft meshing with said lower bevel-gear; a clutch composed of two members supported on a suitable pin, the first member rotating and provided with a bevel-gear meshing with said upper bevel-gear on the vertical shaft, and the second member adapted also to slide on the pin and provided with a gear temporarily in engagement with the feeding-mechanism gears, the feeding mechanism and feeding-mechanism gears, connections from said feeding-mechanism gears to operate the feeding mechanism; a platform-scale supported in a suitable inclosing box below the feeding mechanism, a tripper on the scale moving down therewith when the scale is loaded, a pin on the tripper; a swinging dog-arm suitably journaled, a stop on the inner end thereof, a hinged latch-piece on the outer end thereof resting on said pin and rising and falling therewith, an adjustable dog extending outwardly from the latch-piece; a rotating rack on the vertical shaft to engage with the dog when the dog is depressed; a vertical rock-shaft, a rocking spring connected thereto and to a fixed point to rock the rock-shaft, a rocker-arm on the rock-shaft engaging with the dog-arm stop, a forked arm on the rock-shaft engaging with the second clutch member to disengage the clutch members when the rock-shaft is rocked; a second rock-arm on the rock-shaft, a mutilated gear suitably journaled, a pin on the inner face of the mutilated gear to engage with the second rock-arm to rock the rock-shaft and clutch back into engaging position; connections from the main shaft to rotate the mutilated gear, a horizontal rock-shaft, a toothed crank-arm and pusher-arm keyed on the horizontal rock-shaft, a connection between the pusher-arm and pusher, the pusher-presser composed of a lower pusher-board and an upper presser-board hinged thereto, guides for the lower pusher-board fitted to slots in the frame, a fixed rack adjacent to the forward end of the slots, and a toothed arm hinged to the presser-board and adapted to engage with said fixed rack to swing the presser-board down on the stock when the pusher has reached its forward position, a carrier to receive the stock from the pusher and remove it to the card, and connections from the pinion to operate the pusher-presser and the carrier.

16. In a card-feeding machine, the combination of suitable feeding mechanism to separate the fiber and means for operating it, a platform-scale arranged beneath the feeding mechanism, a substantially vertically arranged pusher-board adapted to reciprocate across the platform to remove the stock therefrom, a hinged presser-board to compress the stock after it has been removed, means for operating the pusher-board and presser-board periodically, and means operated by the depression of the platform temporarily to suspend the operation of the feeding mechanism.

17. In a card-feeding machine, the combination with suitable feeding mechanism to comb down the stock, of a receiving-platform to receive the stock, a pusher-board arranged to reciprocate across the platform to remove the stock therefrom, means for periodically operating said pusher-board, means for operating the feeding mechanism, and means for temporarily suspending the operation of the feeding mechanism while the pusher-board is removing the stock.

18. In a card-feeding machine, the combination with suitable feeding mechanism to comb down the stock, of a receiving-platform arranged beneath the feeding mechanism to receive the stock, a pusher-board to deliver the stock from the platform, means for periodically operating the pusher-board to remove the stock therefrom to a suitable carrier, a presser-board to compress the stock, means to rock the presser-board onto the stock after it has been removed from the platform, means for operating the feeding mechanism, and means for temporarily suspending the operation of the feeding mechanism while the pusher-board and presser-board are in opertion and returning to their normal positions.

19. In combination in a card-feeding machine, a feed-chute formed with slots in its bottom, feed-combs operating in said slots to comb down the fiber, means to operate the combs, a receiving-platform for the fiber, a vertical pusher-board arranged across the platform at one side thereof and with its lower edge adjacent thereto, means temporarily to suspend the operation of the feeding-combs, and means for periodically operating the pusher-board to remove the stock while the operation of the feed-combs is suspended.

20. In a card-feeding machine, a suitable feeding mechanism, a receiving-platform, means for operating the feeding mechanism and temporarily suspending its operation while the stock is being removed, and a pusher-presser having in combination a pusher-board arranged substantially vertically, a presser-board arranged above the pusher-board and in substantially the same plane, means to move the pusher-presser across the platform to remove the stock therefrom, and means to swing the presser-board down onto the stock when it has been removed.

21. In a card-feeding machine, a suitable feeding mechanism, a receiving-platform, means for operating the feeding mechanism and temporarily suspending its operation while the stock is being removed, and a pusher-presser having in combination a vertically-arranged narrow pusher-board, a vertically-arranged presser-board of greater width supported by a hinged support above the pusher-board and in the same plane therewith, means to move the pusher-presser forward across the platform periodically to remove the stock therefrom while the operation of the feeding mechanism is suspended, and means to swing the presser-board down on the stock when the pusher-presser has reached the limit of its forward movement.

In testimony whereof I have hereunto signed my name.

JAMES HOGG. [L. S.]

Witnesses:
 FLORENCE I. HOGG,
 EDWARD P. WHITE.